United States Patent
Tsai

(10) Patent No.: US 8,429,343 B1
(45) Date of Patent: Apr. 23, 2013

(54) HYBRID DRIVE EMPLOYING NON-VOLATILE SEMICONDUCTOR MEMORY TO FACILITATE REFRESHING DISK

(75) Inventor: Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 362 days.

(21) Appl. No.: 12/909,555

(22) Filed: Oct. 21, 2010

(51) Int. Cl.
  *G06F 12/00* (2006.01)

(52) U.S. Cl.
  USPC .......................................... 711/113; 711/103

(58) Field of Classification Search .................. None
  See application file for complete search history.

(56) References Cited

U.S. PATENT DOCUMENTS

| | | | |
|---|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,142,385 B2 | 11/2006 | Shimotono et al. |
| 7,174,478 B2 | 2/2007 | Asano |
| 7,334,082 B2 | 2/2008 | Grover et al. |
| 7,395,452 B2 | 7/2008 | Nicholson et al. |
| 7,411,757 B2 | 8/2008 | Chu et al. |
| 7,461,202 B2 | 12/2008 | Forrer, Jr. et al. |
| 7,472,219 B2 | 12/2008 | Tamura et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Kevin Verbrugge

(57) ABSTRACT

A hybrid drive is disclosed comprising a head actuated over a disk comprising a plurality of data sectors, and a non-volatile semiconductor memory (NVSM). A plurality of refresh zones are defined, wherein each refresh zone comprises a plurality of the data sectors on the disk, and a refresh monitor is maintained for each refresh zone. When a write command is received from a host comprising data and the data is targeted to the NVSM, the data is written to the NVSM. When the data is targeted to a first refresh zone on the disk, and a first refresh monitor has not reached a refresh limit, the data is written to the first refresh zone. When the data is targeted to the first refresh zone on the disk, and the first refresh monitor has reached the refresh limit, the data is written to the NVSM.

14 Claims, 4 Drawing Sheets

U.S. PATENT DOCUMENTS

| | | |
|---|---|---|
| 7,610,438 B2 | 10/2009 | Lee et al. |
| 7,613,876 B2 | 11/2009 | Bruce et al. |
| 7,644,231 B2 | 1/2010 | Recio et al. |
| 7,685,360 B1 | 3/2010 | Brunnett et al. |
| 7,752,491 B1 | 7/2010 | Liikanen et al. |
| 8,194,340 B1 | 6/2012 | Boyle et al. |
| 2006/0195657 A1 | 8/2006 | Tien et al. |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0244188 A1 | 10/2008 | Yoshida |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0182933 A1 | 7/2009 | Jang et al. |
| 2009/0204852 A1 | 8/2009 | Diggs et al. |
| 2009/0249168 A1 | 10/2009 | Inoue |
| 2009/0271562 A1 | 10/2009 | Sinclair |
| 2009/0327603 A1 | 12/2009 | Mckean et al. |
| 2010/0088459 A1 | 4/2010 | Arya et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HIPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

HYBRID DRIVE EMPLOYING NON-VOLATILE SEMICONDUCTOR MEMORY TO FACILITATE REFRESHING DISK

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a
NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
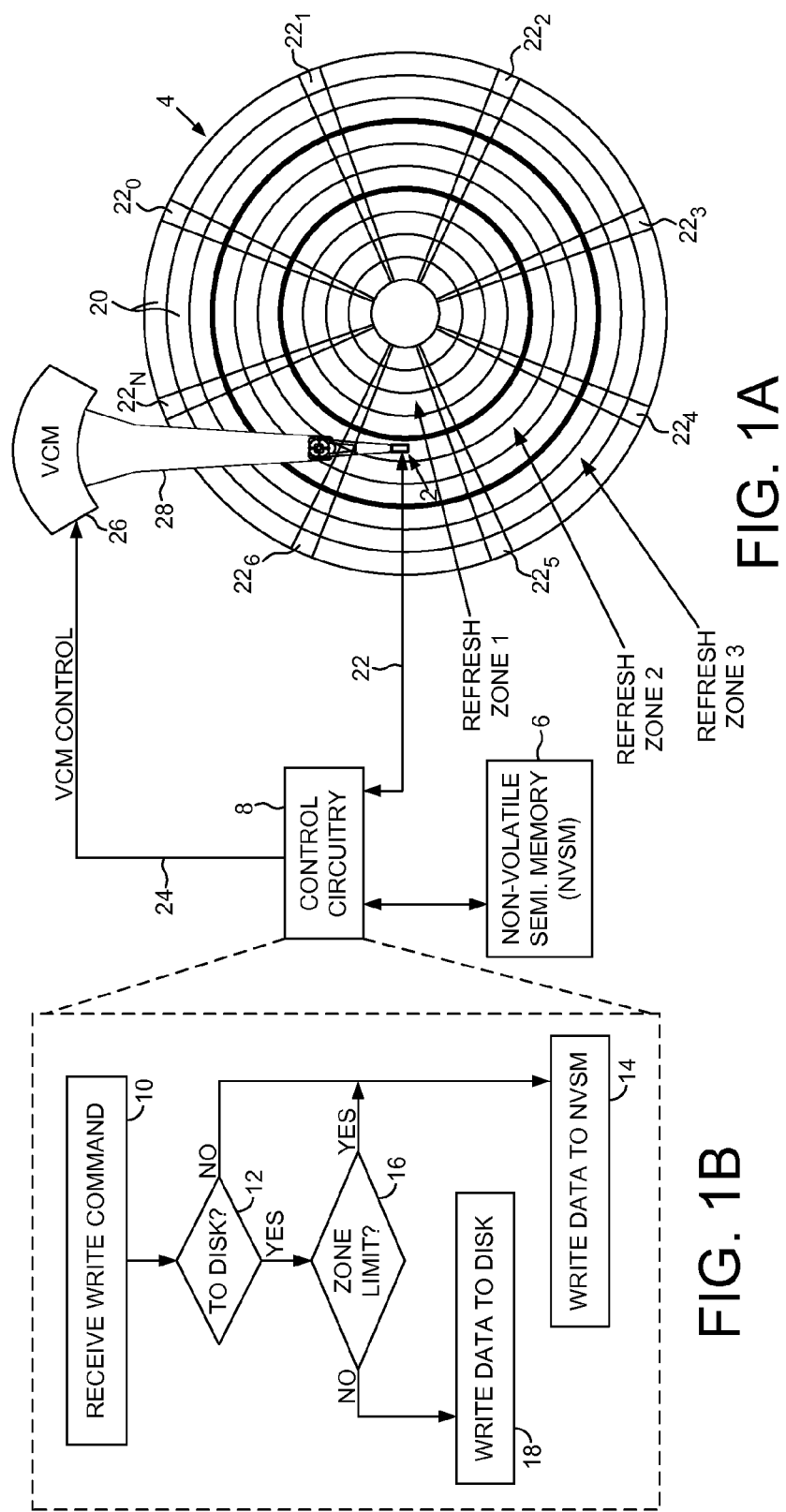
FIG. 1A shows a hybrid drive according to an embodiment of the present invention comprising a head actuated over a disk comprising a plurality of data sectors, and a non-volatile semiconductor memory (NVSM).
FIG. 1B is a flow diagram according to an embodiment of the present invention wherein data received in a write command and targeted to a refresh zone on the disk is written to the NVSM when a corresponding refresh monitor has reached a refresh limit.

FIG. 1A shows a hybrid drive according to an embodiment of the present invention comprising a head 2 actuated over a disk 4 comprising a plurality of data sectors, and a non-volatile semiconductor memory (NVSM) 6. A plurality of refresh zones are defined, wherein each refresh zone comprises a plurality of the data sectors on the disk, and a refresh monitor is maintained for each refresh zone. The hybrid drive further comprises control circuitry 8 operable to execute the flow diagram of FIG. 1B, wherein when a write command is received from a host comprising data (step 10) and the data is targeted to the NVSM (step 12), the data is written to the NVSM (step 14). When the data is targeted to a first refresh zone on the disk (step 12), and a first refresh monitor has not reached a refresh limit (step 16), the data is written to the first refresh zone (step 18). When the data is targeted to the first refresh zone on the disk (step 16), and the first refresh monitor has reached the refresh limit, the data is written to the NVSM (step 14).

In the embodiment of FIG. 1A, any suitable NVSM 6 may be employed, such as any suitable electrically erasable/programmable memory (e.g., a flash memory). In one embodiment, the NVSM 6 comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

The disk 4 shown in the embodiment of FIG. 1A comprises a plurality of servo sectors $22_0$-$22_N$ that define data tracks 20, where each data track comprises a plurality of the data sectors and each refresh zone comprises a plurality of the data tracks 20. The control circuitry 8 processes a read signal 22 emanating from the head 2 to demodulate the servo sectors $22_0$-$22_N$ into a position error signal (PES) representing a position error of the head relative to a target data track. The control circuitry 8 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

Figure 2:
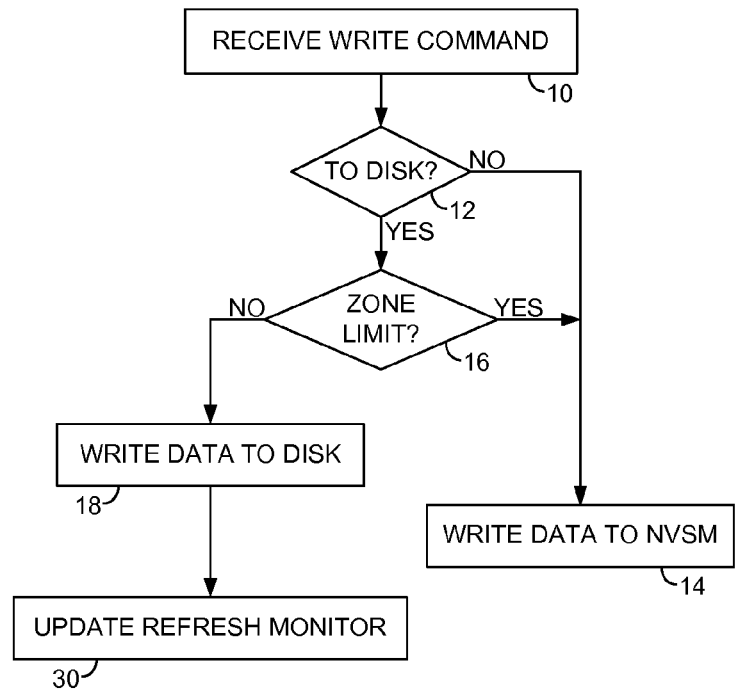
FIG. 2 is a flow diagram according to an embodiment of the present invention wherein a refresh monitor is updated in connection with writing data to the refresh zone.

FIG. 2 is a flow diagram according to an embodiment of the present invention that expands on the flow diagram of FIG. 1B, wherein after writing data to a refresh zone on the disk (step 18), a corresponding refresh monitor is updated (step 30). In this embodiment, each refresh monitor tracks a number of write operations to each refresh zone since each write operation tends to interfere with other data already recorded in the refresh zone. When the number of write operations performed in a refresh zone exceeds a limit, the entire zone is refreshed by reading and rewriting each data sector. Other embodiments of the present invention may update the refresh monitors based on factors other than, or in addition to, the number of write operations performed in a refresh zone. For example, in one embodiment the refresh monitor may be updated over time to account for naturally occurring magnetic entropy. Other embodiments may bias the refresh monitors based on environmental conditions, such as the ambient temperature or pressure.

When a refresh monitor reaches a refresh limit indicating that the corresponding refresh zone needs to be refreshed, subsequent write operations targeted to the refresh zone are redirected to the NVSM rather than holding off the host. The NVSM is used to service write commands targeted to the refresh zone until the refresh zone is refreshed and able to service subsequent write commands.

Figure 3:
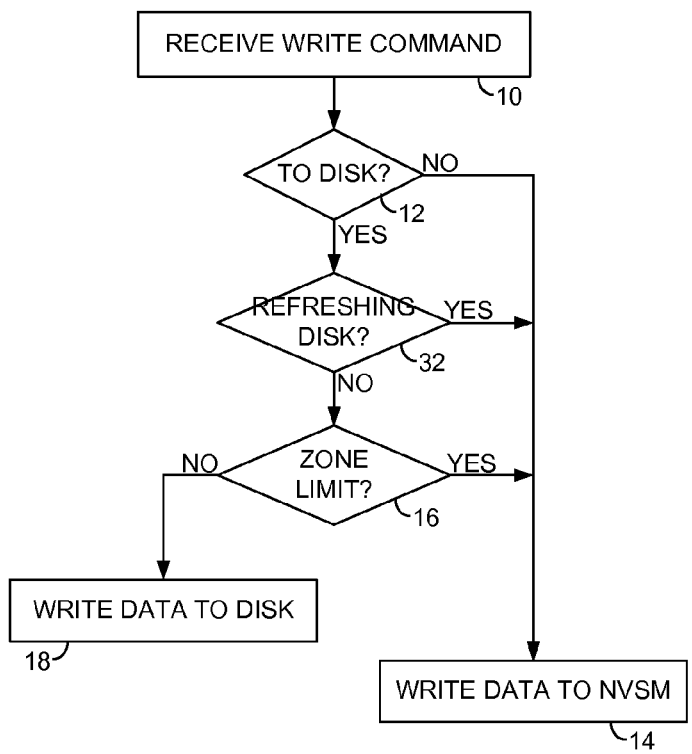
FIG. 3 is a flow diagram according to an embodiment of the present invention wherein when refreshing a refresh zone on the disk, data is written to the NVSM to avoid interrupting the refresh operation.

FIG. 3 is a flow diagram according to an embodiment of the present invention wherein when a write command is received from the host (step 10) that is targeted to a second refresh zone of the disk (step 12) while refreshing a first refresh zone of the disk (step 32), the data is written to the NVSM (step 14). This embodiment allows a refresh operation of any refresh zone to continue uninterrupted by servicing write commands using the NVSM. The refresh operation may be interrupted if a read command is received from the host to read data from the disk that is not stored in the NVSM.

Figure 4A:
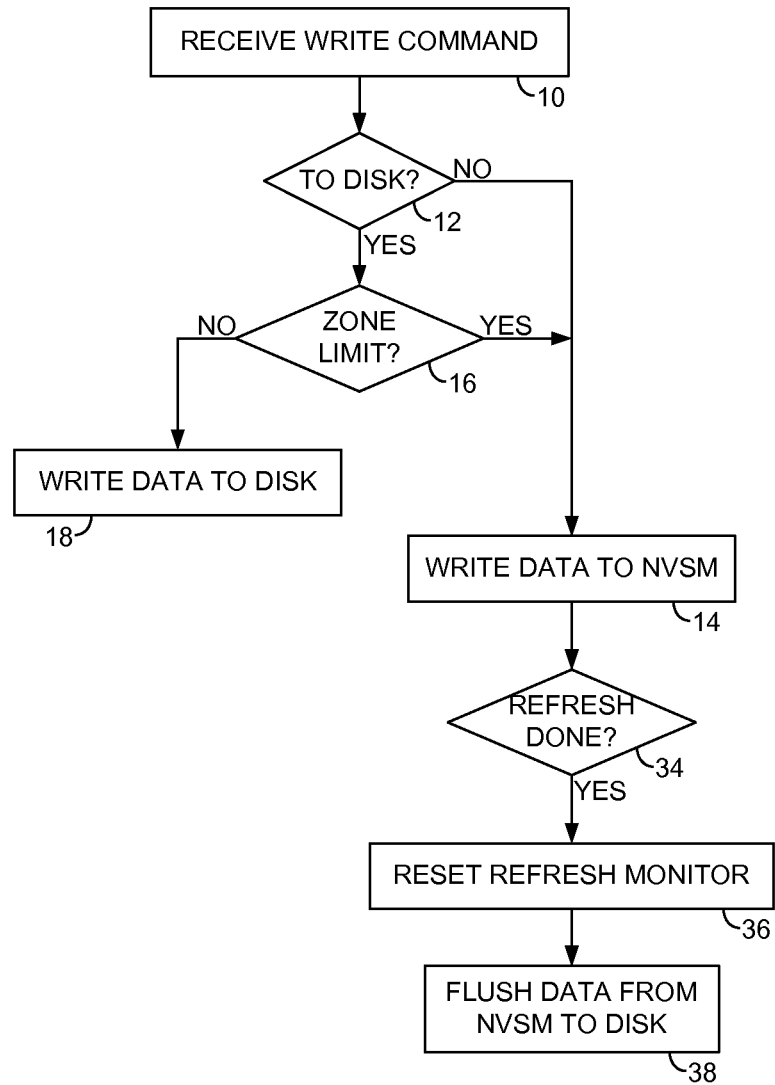
FIG. 4A is a flow diagram according to an embodiment of the present invention wherein after refreshing a refresh zone, data stored in the NVSM is flushed to the disk.

FIG. 4A is a flow diagram according to an embodiment of the present invention wherein when a refresh zone has finished being refreshed (step 34) the corresponding refresh monitor is reset (step 36) and data that was written to the NVSM during the refresh operation is flushed to the disk (step 38). The data may be flushed from the NVSM to the disk in order to free memory space in the NVSM. In one embodiment, the data selected for flushing from the NVSM to the disk is the least frequently read data so that the more frequently read data remains longer in the NVSM. In this manner, the performance improvement of reading data from the NVSM is realized as long as the data remains in the NVSM.

Figure 4B:
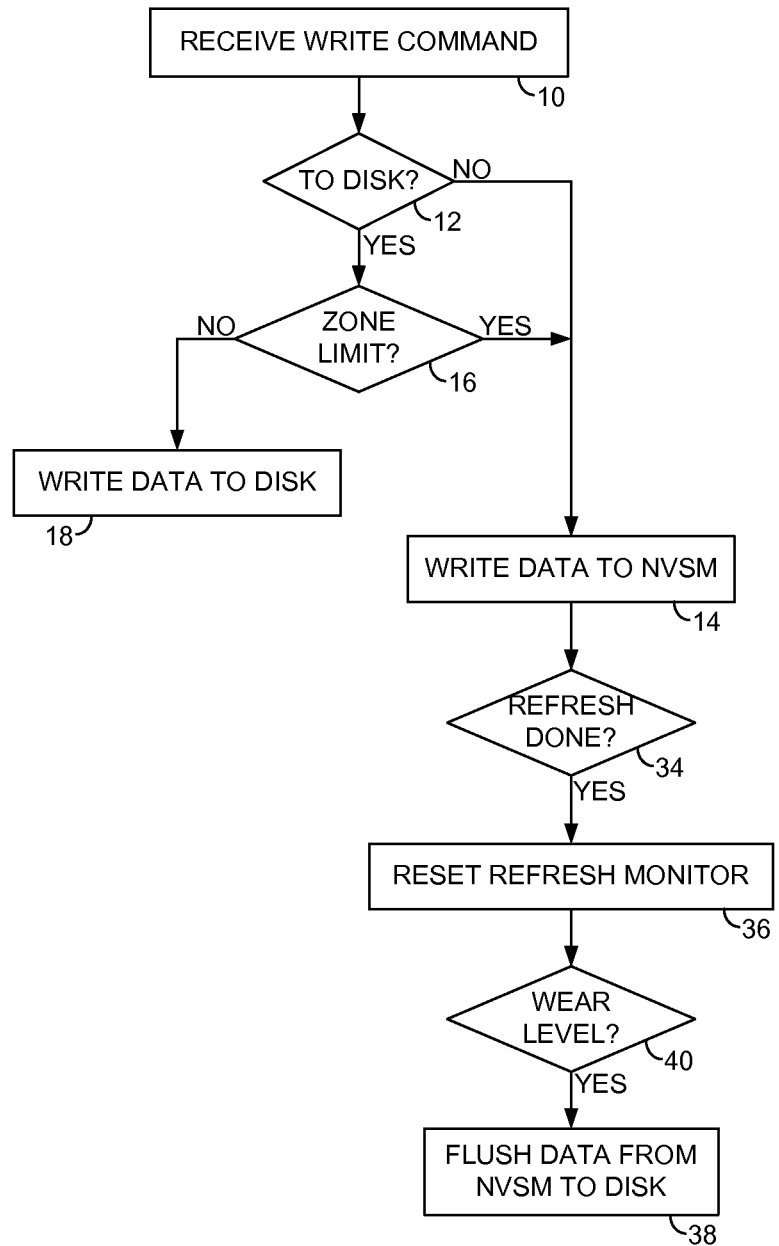
FIG. 4B is a flow diagram according to an embodiment of the present invention wherein data is flushed from the NVSM to the disk in connection with executing a wear leveling algorithm for the NVSM.

In another embodiment shown in the flow diagram of FIG. 4B, the data may be flushed from the NVSM to the disk in connection with executing a wear leveling algorithm (step 40) on the NVSM. A wear leveling algorithm helps ensure the memory segments of the NVSM are written evenly over time so that the memory segments wear out together (since each memory segment may be erased/written a limited number of times). In this embodiment, data that was originally targeted to the disk may remain in the NVSM for an extended period after refreshing a refresh zone so that the data may be accessed from the NVSM until the wear leveling algorithm flushes the data to the disk.

In one embodiment, if an LBA corresponding to data stored in the NVSM is overwritten (by a subsequent write operation after refreshing a refresh zone), the new data is written to the refresh zone on the disk and the memory segment of the NVSM is invalidated and eventually erased during a garbage collection operation.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data sectors;
   a head actuated over the disk;
   a non-volatile semiconductor memory (NVSM); and
   control circuitry operable to:
      define a plurality of refresh zones, wherein each refresh zone comprises a plurality of the data sectors on the disk;
      maintain a refresh monitor for each refresh zone;
      receive a write command from a host comprising data;
      when the data is targeted to the NVSM, write the data to the NVSM;
      when the data is targeted to a first refresh zone on the disk, and a first refresh monitor has not reached a refresh limit, write the data to the first refresh zone; and
      when the data is targeted to the first refresh zone on the disk, and the first refresh monitor has reached the refresh limit, write the data to the NVSM.

2. The hybrid drive as recited in claim 1, wherein the control circuitry is further operable to update the first refresh monitor in connection with writing data to the first refresh zone.

3. The hybrid drive as recited in claim 2, wherein the control circuitry is further operable to update the first refresh monitor over time.

4. The hybrid drive as recited in claim 1, wherein the control circuitry is further operable to write the data to the NVSM when refreshing any one of the refresh zones.

5. The hybrid drive as recited in claim 1, wherein the control circuitry is further operable to flush at least part of the data from the NVSM to the first refresh zone after refreshing the first refresh zone.

6. The hybrid drive as recited in claim 5, wherein the control circuitry is further operable to flush the data least frequently read.

7. The hybrid drive as recited in claim 5, wherein the control circuitry is further operable to flush at least part of the data in connection with executing a wear leveling algorithm for the NVSM.

8. A method of operating a hybrid drive comprising a head actuated over a disk comprising a plurality of data sectors, and a non-volatile semiconductor memory (NVSM), the method comprising:
   defining a plurality of refresh zones, wherein each refresh zone comprises a plurality of the data sectors on the disk;
   maintaining a refresh monitor for each refresh zone;
   receiving a write command from a host comprising data;
   when the data is targeted to the NVSM, writing the data to the NVSM;
   when the data is targeted to a first refresh zone on the disk, and a first refresh monitor has not reached a refresh limit, writing the data to the first refresh zone; and
   when the data is targeted to the first refresh zone on the disk, and the first refresh monitor has reached the refresh limit, writing the data to the NVSM.

9. The method as recited in claim 8, further comprising updating the first refresh monitor in connection with writing data to the first refresh zone.

10. The method as recited in claim 9, further comprising updating the first refresh monitor over time.

11. The method as recited in claim 8, further comprising writing the data to the NVSM when refreshing any one of the refresh zones.

12. The method as recited in claim 8, further comprising flushing at least part of the data from the NVSM to the first refresh zone after refreshing the first refresh zone.

13. The method as recited in claim 12, further comprising flushing the data least frequently read.

14. The method as recited in claim 12, further comprising flushing at least part of the data in connection with executing a wear leveling algorithm for the NVSM.

* * * * *